US011747256B2

(12) United States Patent
Galbreth et al.

(10) Patent No.: US 11,747,256 B2
(45) Date of Patent: Sep. 5, 2023

(54) TRIPLE BUBBLER SYSTEM, FAST-BUBBLING APPROACH, AND RELATED METHODS

(71) Applicant: Battelle Energy Alliance, LLC, Idaho Falls, ID (US)

(72) Inventors: Gregory G. Galbreth, Idaho Falls, ID (US); Ammon N. Williams, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 58 days.

(21) Appl. No.: 17/249,849

(22) Filed: Mar. 16, 2021

(65) Prior Publication Data

US 2021/0310923 A1 Oct. 7, 2021

Related U.S. Application Data

(60) Provisional application No. 62/990,712, filed on Mar. 17, 2020.

(51) Int. Cl.
| | |
|---|---|
| *G01N 9/28* | (2006.01) |
| *G01F 23/16* | (2006.01) |
| *G01N 13/02* | (2006.01) |
| *G01N 25/16* | (2006.01) |

(52) U.S. Cl.
CPC ........... *G01N 13/02* (2013.01); *G01F 23/165* (2013.01); *G01F 23/168* (2013.01); *G01N 9/28* (2013.01); *G01N 25/16* (2013.01); *G01N 2013/0266* (2013.01)

(58) Field of Classification Search
CPC ........................ G01N 9/28; G01N 2013/0266; G01F 23/168; G01F 23/167; G01F 23/165
See application file for complete search history.

(56) References Cited

U.S. PATENT DOCUMENTS

| 3,765,227 A | 10/1973 | Campbell et al. |
| 4,416,148 A | 11/1983 | Klus et al. |
| 2017/0074084 A1* | 3/2017 | Gettis ................ B01D 19/0042 |

OTHER PUBLICATIONS

Galbreth et al., "The Application of a Triple Bubbler System in Molten Salt for Accurate Mass and Volume Determination," INL/CON-18-44523-Revision-0, (Jul. 2018), 9 pages.
(Continued)

*Primary Examiner* — Paul M. West
(74) *Attorney, Agent, or Firm* — TraskBritt

(57) ABSTRACT

A triple bubbler system includes a first fluid probe, a second fluid probe, a third fluid probe, a gas source operably coupled to the first fluid probe, the second fluid probe, and the third fluid probe and configured to meter gas through the first fluid probe, the second fluid probe, and the third fluid probe to form bubbles at tips of each of the first fluid probe, the second fluid probe, and the third fluid probe, and a cover member disposed over the tips of the first, second, and third fluid probes and configured to at least partially prevent bubbles formed and escaping the tips of the first, second, and third fluid probes from interfering with other bubbles formed at each other tips. The bubbler system includes a thermocouple having a plurality of junctions disposed along an axis parallel to longitudinal axes of the first, second, and third fluid probes.

20 Claims, 12 Drawing Sheets

(56) References Cited

OTHER PUBLICATIONS

Janz, "Table 2. 1. a Density Data (Continued)," J. Phys. Chem., Ref. Data, vol. 17, SuppL 2, (1988), p. 44.

Lambert, "Study of a Double Bubbler for Material Balance in Liquids," Training Report INL/EXT-13-29609 (Sep. 2013), 85 pages.

Miller, "Fuel Cycle Research and Development, Advanced Sensors and Instrumentation R&D—MPACT Campaign," Materials Protection, Accounting, and Control Technologies Campaign Overview, (Oct. 12, 2016), 20 pages.

Mysels et al., "The Maximum Bubble Pressure Method of Measuring Surface Tension, Revisited," Colloids and Surfaces, vol. 43, (1990), pp. 241-262.

Nuclear fuel technology—Tank calibration and volume Determination for Nuclear Materials Accountancy—Part 4 Accurate Determination of Liquid Height in Accountancy Tanks Equipped With Dip Tubes, Slow Bubbling Rate, International Standard, ISO 18213-4:2008(E), 38 pages.

Schrodinger, "Notiz Uber Den Kapllardruck in Gasblasen," From the II. Physical institute of the KK University in Vienna (1914), pp. 413-418.

Standard Test Method for Dynamic Surface Tension by the Fast-Bubble Technique, ASTM Designation: D3825-09 (Withdrawn 2016), (Dec. 1, 2009), 6 pages.

Standard Test Method for Dynamic Surface Tension by the Fast-Bubble Technique, ASTM Designation: D3825-90 (Reapproved 2005), 6 pages.

Sugden, "XCVII.—The Determination of Surface Tension from the Maximum Pressure in Bubbles," Birkbeck College, Chancery Lane, E.C.4. (1922), pp. 858-866.

Williams et al., "Accurate determination of density, surface tension, and vessel depth using a triple bubbler system," Journal of Industrial and Engineering Chemistry, vol. 63, (2018), pp. 149-156.

* cited by examiner

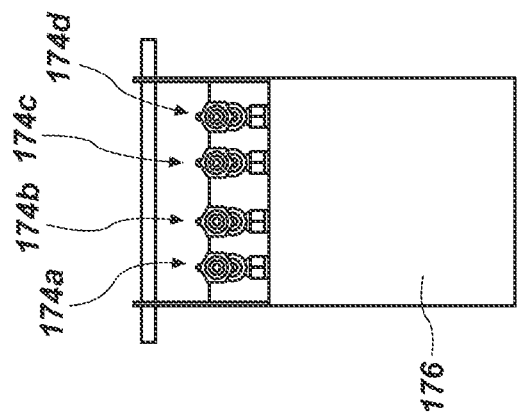
FIG. 11E
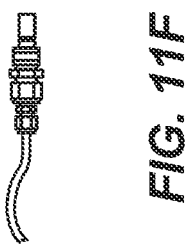
FIG. 11F
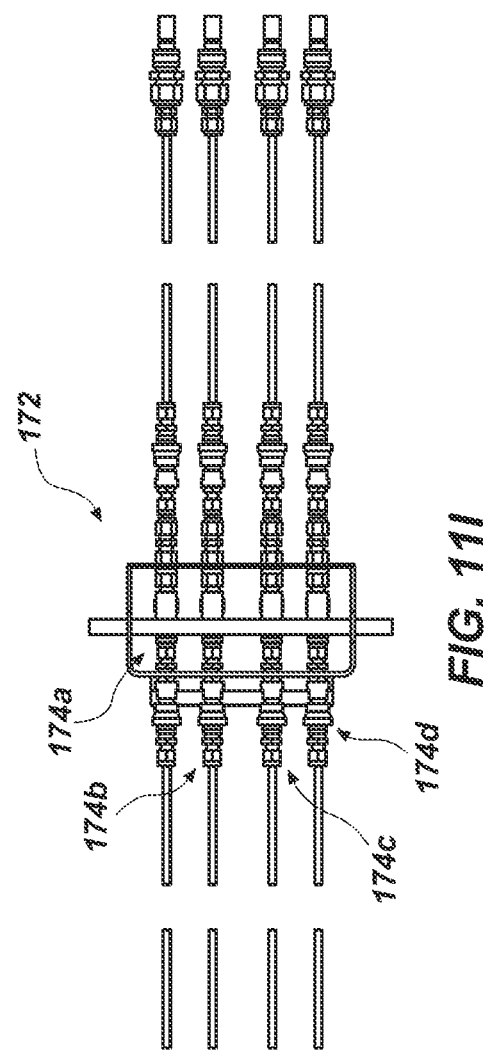
FIG. 11I
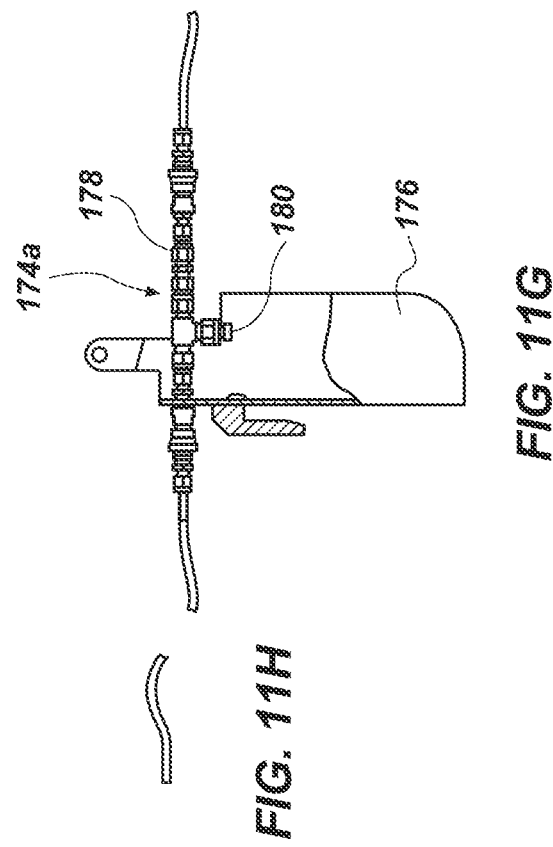
FIG. 11G
FIG. 11H

TRIPLE BUBBLER SYSTEM, FAST-BUBBLING APPROACH, AND RELATED METHODS

CROSS-REFERENCE TO RELATED APPLICATION

This application claims the benefit under 35 U.S.C. § 119(e) of U.S. Provisional Patent Application Ser. No. 62/990,712, filed Mar. 17, 2020, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to bubbler systems for making measurements of fluids in high temperature and turbulent environments. The disclosure further relates to fast-bubbling techniques utilized to make multiple measurements simultaneously.

BACKGROUND

Conventional bubbler systems utilize a maximum bubble pressure approach or a fast bubbling approach from making measurements of fluids, and the two different approaches can provide relatively accurate results in stagnant and low flow fluids. However, the conventional bubbler systems are not capable of achieving accurate results in turbulent fluid flow environments because the formed bubbles do not reach maximum pressure prior to being swept away in the turbulent fluid flow. In addition, conventional bubbler systems' accuracy rapidly declines when utilized at elevated temperatures due to thermal expansion of the bubbler systems.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein:

FIGS. 11A-11I show various views of a breakout box of a triple bubbler system according to one or more embodiments of the present disclosure.

DETAILED DESCRIPTION

Figure 1:
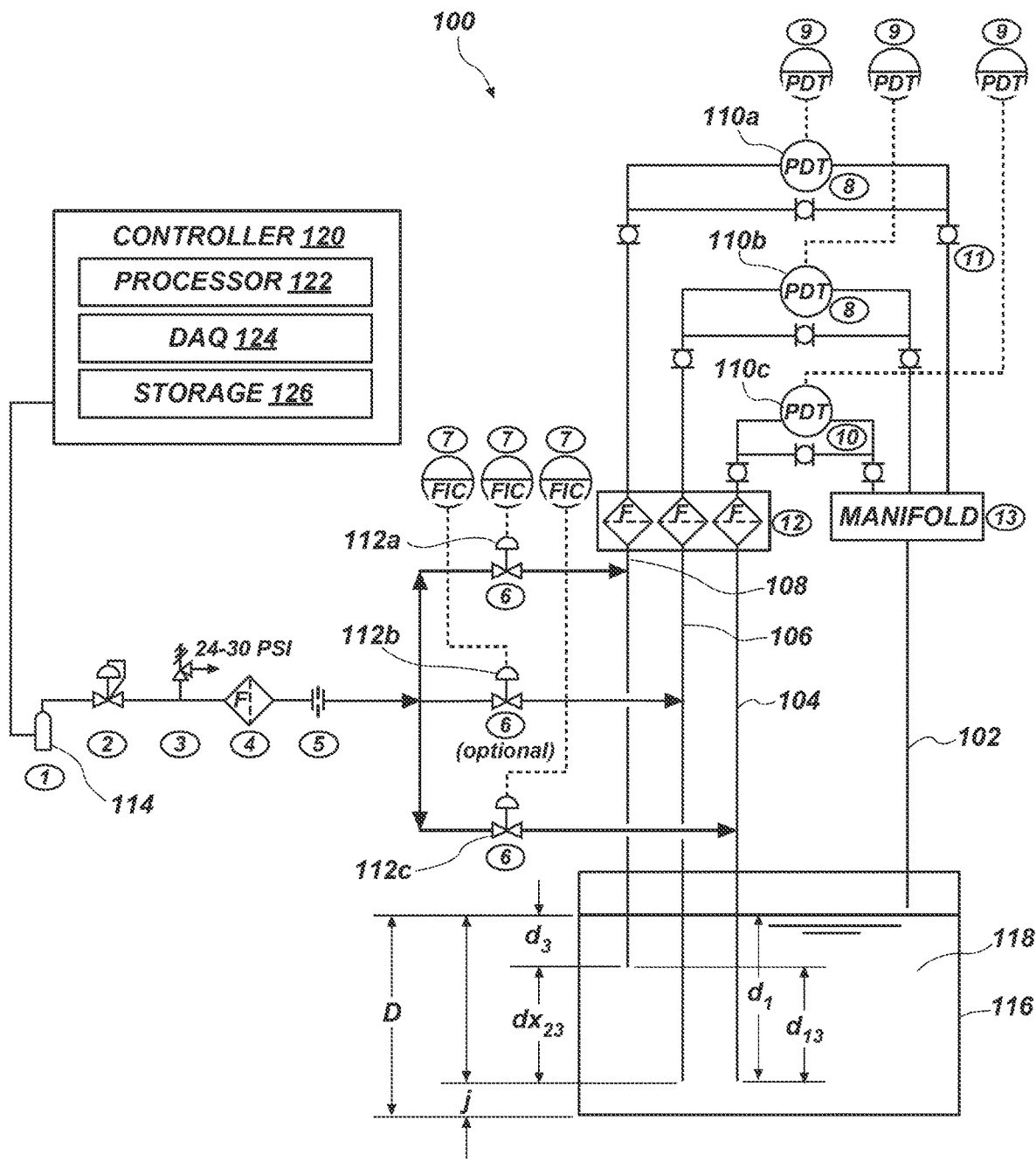
FIG. 1 illustrates a schematic diagram of a triple bubbler system according to one or more embodiments of the present disclosure.

The illustrations presented herein are not actual views of any bubbler system, nuclear reactor system, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "third," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "fast-bubbling technique" may refer to a technique of metering an inert gas through one or more probes (e.g., partially submerged tubes) to form bubbles within a fluid and making pressure measurements of the bubbles during formation to determine at least a fluid density, a fluid depth, and a fluid surface tension. The fast-bubbling technique may refer to metering an inert gas through the one or more probes at a rate of at least 2.0 cc/min, at least 10 cc/min, at least 20 cc/min, at least 30 cc/min, at least 40 cc/min, at least 50 cc/min, etc.

Embodiments of the present disclosure include a triple bubbler system for measuring the density, surface tension, and depth of a fluid in high temperature (e.g., 200° C. to 1000° C.) and turbulent fluid environments. The triple bubbler system improves accuracy and diminishes uncertainty of the measurements at high temperatures while broadening the applications of bubbler systems.

Embodiments of the present disclosure further include triple bubbler systems for performing measurements in high temperature and turbulent fluids, the triple bubbler systems utilizing an integrated multi-lead thermocouple and a fast-bubbling technique. The fast bubbling technique may include flow rates of at least 30 cc/min. Furthermore, the multi-lead thermocouple may include a ganged thermocouple (e.g., a multi-junction thermocouple). In particular, the multi-lead thermocouple may include multiple junctions (e.g., welds) along a length of the multi-lead thermocouple. Additionally, the multi-lead thermocouple may include at least one junction in an atmosphere space (e.g., a gas space) above the fluid, and the multi-lead thermocouple may include at least one junction within the fluid. Furthermore, in some embodiments, the multi-lead thermocouple may span at least a portion of a depth of the fluid. As a result, the multi-lead thermocouple enables measuring multiple temperatures along at least a portion of the length of the triple bubbler system and enables measurements to be corrected based on a calculated thermal expansion of the triple bubbler system. In addition, the embodiments of the present disclosure provide for simultaneous measurement of the density, surface tension, and depth using a fast-bubbling technique.

Embodiments of the present also include triple bubbler systems having a cover member oriented over the tips of the probes. The cover member may include individualized compartments (e.g., chambers) for each probe, and the cover member may assist in preventing bubbles formed by a given probe during operation from interfering with bubble formation and/or pressure measurements of the other probes. Additionally, the cover member may reduce the effect of turbulent flow within the fluid on bubble formation and pressure measurements of the probes.

Figure 2:
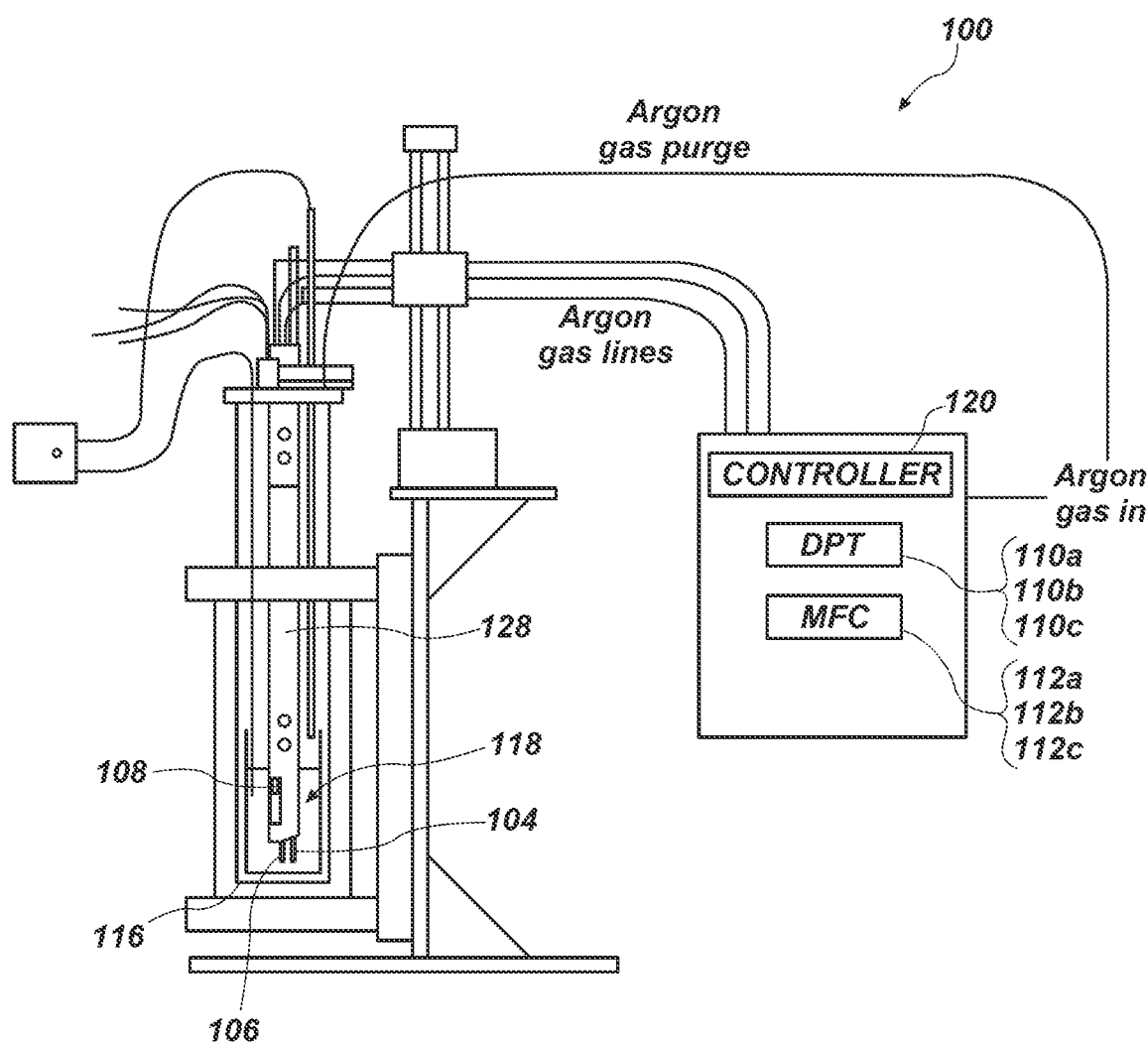
FIG. 2 shows another schematic diagram of a triple bubbler system according to one or more embodiments of the present disclosure.
Figure 3A:
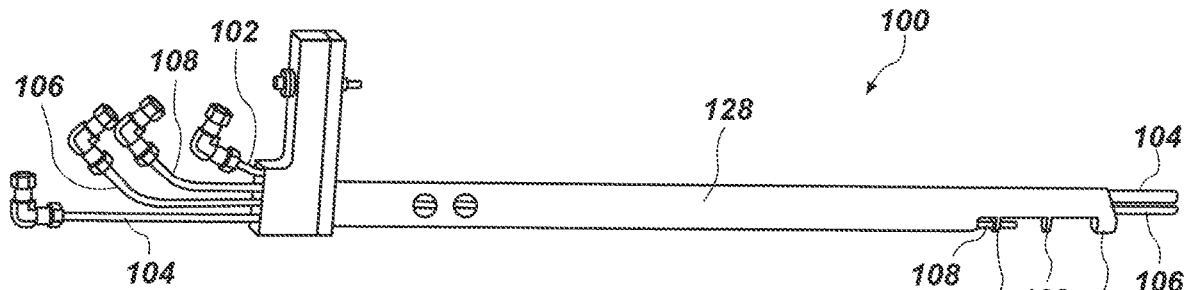
FIG. 3A shows a partial perspective view of a triple bubbler system according to one or more embodiments of the present disclosure.
Figure 3B:
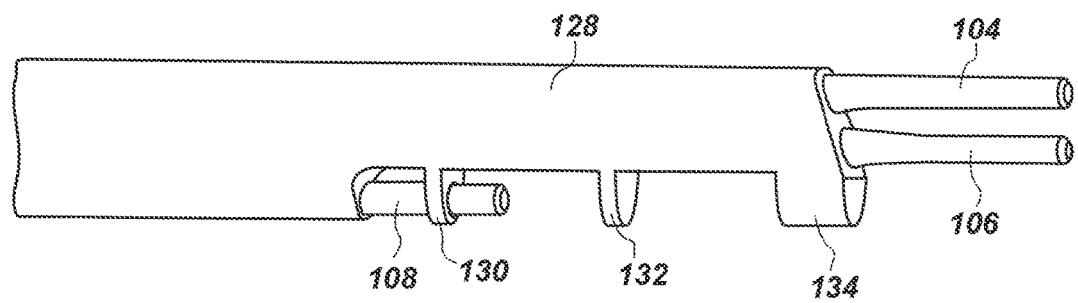
FIG. 3B shows an enlarged partial perspective view of a triple bubbler system according to one or more embodiments of the present disclosure.
Figure 4:
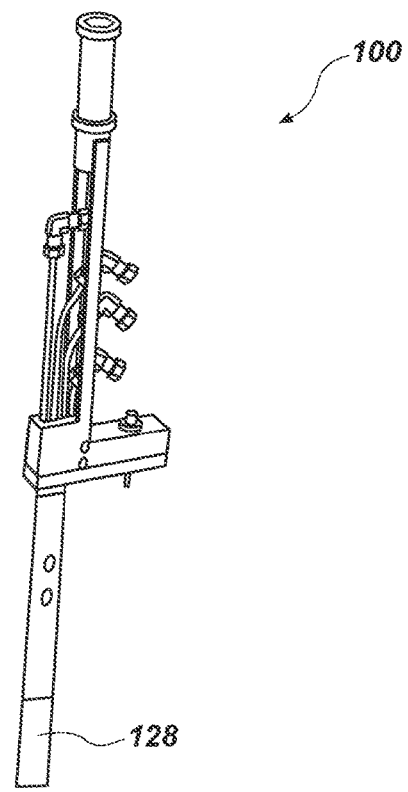
FIG. 4 shows an additional partial perspective view of a triple bubbler system according to one or more embodiments of the present disclosure.
Figure 5:
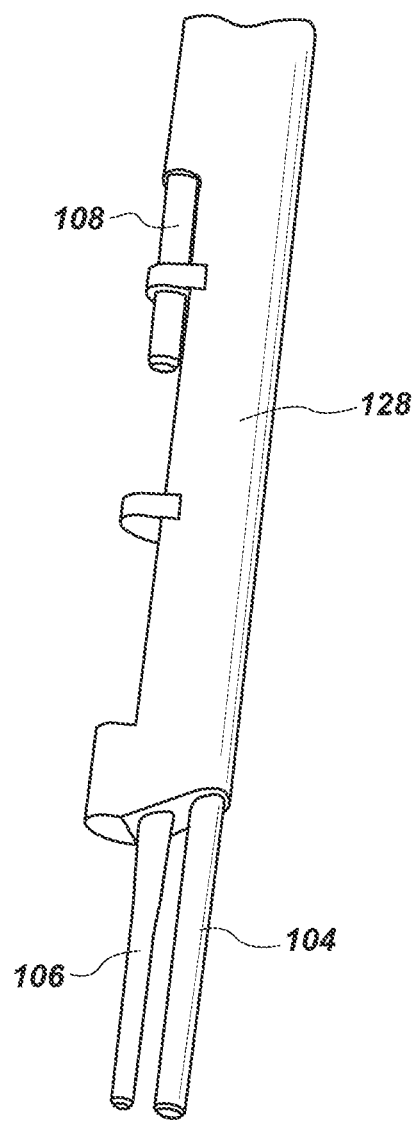
FIG. 5 shows an additional enlarged partial perspective view of a triple bubbler system according to one or more embodiments of the present disclosure.

FIG. 1 is a schematic representation of a triple bubbler system 100 according to one or more embodiments of the present disclosure. FIG. 2 is another schematic representation of the triple bubbler system 100 according to one or more embodiments of the present disclosure. FIG. 3A is a partial perspective view of the triple bubbler system 100 according to one or more embodiments of the present disclosure. FIG. 3B is an enlarged partial perspective view of the triple bubbler system 100 according to one or more embodiments of the present disclosure. FIG. 4 is an additional partial perspective view of the triple bubbler system 100 according to one or more embodiments of the present disclosure. FIG. 5 is an additional enlarged partial perspective view of the triple bubbler system 100 according to one or more embodiments of the present disclosure.

Referring to FIGS. 1-5 together, the triple bubbler system 100 described herein may be utilized for measuring density, surface tension, and depth of a fluid simultaneously in high temperature and turbulent fluid environments. In some embodiments, the triple bubbler system 100 may be utilized in aqueous and molten salt/glass/metal systems. For example, the triple bubbler system 100 may be utilized to provide accurate data (e.g., density, surface tension, and/or depth data) on fluids in molten salt thermal storage applications, molten salt reactors, concentrated solar power plant application, molten salt batteries, molten metal batteries, and/or any other applications involving turbulent fluids and/or relatively high temperatures (e.g., 200° C. to 1000° C.).

In some embodiments, the triple bubbler system 100 may include an atmosphere probe 102, a first fluid probe 104, a second fluid probe 106, a third fluid probe 108, a plurality of differential pressure transducers 110a, 110b, 110c, a plurality of mass flow controllers 112a, 112b, 112c, and a gas supply 114. In some instances herein, the first fluid probe 104, the second fluid probe 106, and the third fluid probe 108 may be referred to collectively as the "fluid probes 104, 106, 108." The triple bubbler system 100 may be suspended above a vessel 116 containing a fluid 118 (e.g., a molten salt), and each of the first fluid probe 104, the second fluid probe 106, the third fluid probe 108 may be at least partially vertically submerged within the fluid 118 (i.e., the fluid to be monitored). In additional embodiments, the triple bubbler system 100 may be supported by a support body (e.g., fixture) that rests on a bottom of the vessel 116. The support body may hold the first fluid probe 104, the second fluid probe 106, and the third fluid probe 108 at a fixed depth, and a remainder of the triple bubbler system 100 may float and/or may not be fixed above the vessel 116.

The triple bubbler system 100 may further include a controller 120 operably coupled to the gas supply 114, the plurality of differential pressure transducers 110a, 110b, 110c, and the plurality of mass flow controllers 112a, 112b, 112c. The controller 120 may include a processor 122, a data acquisition system 124, a data storage device 126 (or a computer-readable medium) for storing data, algorithms, and computer programs. The data storage device 126 may be any suitable device, including, but not limited to, a read-only memory (ROM), a random-access memory (RAM), a flash memory, a magnetic tape, a hard disk, and an optical disc. During operation, the controller 120 may receive (e.g., acquire) data and/or retrieve (e.g., query) data from the plurality of differential pressure transducers 110a, 110b, 110c and/or the plurality of mass flow controllers 112a, 112b, 112c. The controller 120 is described in greater detail below in regard to FIG. 11.

In some embodiments, each of the first fluid probe 104, the second fluid probe 106, and the third fluid probe 108 may include a hollow tube permitting gas to pass therethrough. In one or more embodiments, each of the first fluid probe 104, the second fluid probe 106, and the third fluid probe 108 is coupled to a respective differential pressure transducer of the plurality of differential pressure transducers 110a, 110b, 110c. Additionally, each differential pressure transducer of the plurality of differential pressure transducers 110a, 110b, 110c is communicatively coupled to the atmosphere probe 102 such that atmosphere conditions may be referenced and/or utilized during operation when making measurements, as discussed herein.

Additionally, each of the first fluid probe 104, the second fluid probe 106, and the third fluid probe 108 is coupled to a respective mass flow controller of the plurality of mass flow controllers 112a, 112b, 112c. The plurality of mass flow controllers 112a, 112b, 112c are utilized to meter an inert gas (e.g., argon) through each of the first fluid probe 104, the second fluid probe 106, and the third fluid probe 108 and into the fluid 118 at selected flowrates. In one or more embodiments, instead of and/or in addition to the plurality of mass flow controllers 112a, 112b, 112c the triple bubbler system 100 may include rotameters for metering the inert gas through each of the first fluid probe 104, the second fluid probe 106, and the third fluid probe 108 and into the fluid 118 at selected flowrates.

In some embodiments, the triple bubbler system 100 may further include a pressure reducer (e.g., a pressure reducing valve) for reducing pressure of the gas while maintaining enough pressure to emit gas into the fluid (e.g., a pressure higher than a static pressure within the vessel 116). As noted above, in one or more embodiments, the triple bubbler system 100 may utilize the atmosphere probe 102 to monitor an atmosphere above a fluid level within the vessel 116. Additionally, the triple bubbler system 100 may include one or more orifices for controlling and limiting a flowrate of gas through the first fluid probe 104, the second fluid probe 106, and the third fluid probe 108. The one or more orifices may reduce the risk or injury and may increase the safety of operating the triple bubbler system 100. For instance, in operation, if one or more of the fluid probes 104, 106, 106 becomes plugged and suddenly unplugs, a rapid release of pressure may occur. Absent a means for controlling a flowrate of the gas, a relatively severe splashing event of molten fluid may occur. Accordingly, in one or more embodiments, a primary orifice may be disposed between a pressure reducer and a respective mass flow controller of each fluid probe. In some embodiments, the primary orifice may have an aperture having a diameter of about 0.18 mm and may limit flowrate of gas released in such an event (e.g., may limit the flowrate to about 1 liter/min at an example 90 psi).

Referring still to FIGS. 1-5 together, in some embodiments, each of the first fluid probe 104, the second fluid probe 106, and the third fluid probe 108 may be positioned at least a first distance from a bottom (e.g., a bottom surface) of the vessel 116. In one or more embodiments, the first distance (j) may be within a range of about 0.2 cm and about 20.0 cm. For example, the first distance (j) may be about 2.0 cm, 4.5 cm, or 10.0 cm. In further embodiments, the first distance (j) may be greater than 20.0 cm. Additionally, a distance ($dX_{23}$) between a tip of the second fluid probe 106 and a tip of the third fluid probe 108 may be at least about 10.0 cm, 15.0 cm, 20.0 cm, or greater.

Furthermore, each of the first fluid probe 104, the second fluid probe 106, and the third fluid probe 108 may be submerged within the fluid 118 to a sufficient depth ($d_3$) to develop (e.g., ensure) a sufficient pressure head within each of the first fluid probe 104, the second fluid probe 106, and the third fluid probe 108 to provide accurate pressure measurements via the plurality of differential pressure transducers 110a, 110b, 110c. For example, the third depth ($d_3$) may be at least about 3.0 cm of fluid 118. In some embodiments, the third depth ($d_3$) may be at least about 5.0 cm, 7.0 cm, 10.0 cm, or greater. The plurality of differential pressure transducers 110a, 110b, 110c may individually monitor a respective fluid probe and may also reference the atmosphere probe 102.

In one or more embodiments, the first fluid probe 104 may be disposed within the fluid 118 by a first distance ($d_1$). In some embodiments, both the first fluid probe 104 and the second fluid probe 106 may be disposed within the fluid 118 by at least a second distance ($d_2$). In other words, the tips of the first fluid probe 104 and the second fluid probe 106 may be disposed at least a second depth ($d_2$) within the fluid 118. Additionally, the third fluid probe 108 may be submerged within the fluid 118 by a third distance ($d_3$). In other words, a tip of the third fluid probe 108 may be disposed at a third depth ($d_3$) within the fluid 118. In one or more embodiments, the third distance ($d_3$) may be less than the second distance ($d_2$). For example, the first fluid probe 104 and the second fluid probe 106 may be disposed deeper into the fluid 118 in comparison to the third fluid probe 108. In alternative embodiments, the third distance ($d_3$) may be greater than the second distance ($d_2$). For example, the third fluid probe 108 may be submerged deeper into the fluid 118 in comparison to the first fluid probe 104 and the second fluid probe 106. Regardless, the third fluid probe 108 may be disposed at a depth ($d_3$) that is different from the depth ($d_2$) at which the first fluid probe 104 and the second fluid probe 106 are disposed. In one or more embodiments, the first fluid probe 104 and the second fluid probe 106 and may also be disposed at different depths.

Furthermore, in some embodiments, the first fluid probe 104 and the third fluid probe 108 may have a same internal radius at their tips (e.g., at their open ends within the fluid 118). Additionally, in some embodiments, the second fluid probe 106 may have a different internal radius at its tip in comparison to the internal radii of the first fluid probe 104 and the third fluid probe 108. For example, in some instances, the second fluid probe 106 may have a smaller internal radius in comparison to the internal radii of the first fluid probe 104 and the third fluid probe 108. In other instances, the second fluid probe 106 may have a larger internal radius in comparison to the internal radii of the first fluid probe 104 and the third fluid probe 108.

Referring still to FIGS. 1-5 together, in some embodiments, the triple bubbler system 100 may include a shroud 128 surrounding at least portions of the first fluid probe 104, the second fluid probe 106, and the third fluid probe 108. The shroud 128 may provide structural support and physical protection to the first fluid probe 104, the second fluid probe 106, and the third fluid probe 108. For example, the shroud 128 may at least partially secure the first fluid probe 104, the second fluid probe 106, and the third fluid probe 108 in vertical positions (i.e., positions where the longitudinal axes of the fluid probes 104, 106, 108 extend in a vertical direction). The shroud 128 may leave the tips of the first fluid probe 104, the second fluid probe 106, and the third fluid probe 108 exposed. Referring to FIGS. 3B and 5 specifically, in some embodiments, the shroud 128 may include one or more protrusions 130, 132, 134 (e.g., bulkheads) axially aligned with the first fluid probe 104. In some instances, the third fluid probe 108 may extend at least partially through one or more of the protrusions 130, 132, 134. Additionally, the third fluid probe 108 may be free within the protrusions 130, 132, 134. In other words, the third fluid probe 108 may not be fixed to the protrusions 130, 132, 134. As will be described in greater detail below, leaving third fluid probe 108 free relative to the protrusions 130, 132, 134 allows for differential thermal expansion between the third fluid probe 108 and the shroud 128. Likewise, the first fluid probe 104 and the second fluid probe 106 may not be fixed to one or more portions of the shroud 128.

In some embodiments, the protrusions 130, 132, 134 may assist in mitigating bubbles formed at the tips of the first fluid probe 104 and the second fluid probe 106 from interfering with bubble formation and pressure measurements of the third fluid probe 108. Additionally, the shroud 128 may include one or more holes formed therein to enable measuring of static pressures. For example, the one or more holes formed in the shroud 128 may equalize an interior pressure of the shroud 128 with an exterior of the shroud 128. In some embodiments, the one or more holes may be formed to be above a fluid level within the vessel 116. Furthermore, when a vessel 116 is pressurized, the one or more holes may permit the fluid (e.g., a molten salt) to flow through the holes (e.g., into or out of) the shroud 128. In one or more embodiments, the shroud 128 may be sized and shaped to not extend into the fluid 118. For instance, the shroud 128 may be suspended above the fluid 118. In other embodiments, the shroud 128 may be sized and shaped to extend into the fluid 118.

In view of the foregoing, the triple bubbler system 100 may include any of the triple bubbler systems described in, any portions of the triple bubbler systems described in, or any other triple bubbler systems referenced in U.S. Provisional Patent Application No. 62/990,712, filed Mar. 17, 2020, the disclosure of which is incorporated in its entirety by reference herein.

Referring still to FIGS. 1-5, as is described in further detail below, the triple bubbler system 100 may utilize the first fluid probe 104 and the third fluid probe 108 in determining a density of the fluid. Additionally, the triple bubbler system 100 may utilize the first fluid probe 104 and the second fluid probe 106 in determining surface tension. Furthermore, the triple bubbler system 100 may utilize any of the first fluid probe 104, the second fluid probe 106, and/or the third fluid probe 108 in determining a depth of the fluid.

In some embodiments, the triple bubbler system 100 may utilize one or more fast-bubble approaches (e.g., techniques) in making measurements for determining density, depth, and/or surface tension of a fluid. For example, in determining the surface tension of the fluid, the triple bubbler system 100 may utilize a bubbling technique similar to the bubbling technique described in ASTM D 3825-90 (Reapproved 2005).

ASTM D 3825-90 references internal diameters of capillaries (i.e., probes) being 2.0 mm and 0.11 mm. However, these diameters can prove problematic for instrumentation in an actual vessel (i.e., real-life environment) vs instrumentation in a laboratory. In actual vessels, bending of the probes should be avoided (i.e., prevented), and the probes need to be reasonably machinable. Furthermore, the probes need to be durable and should reduce the likelihood of becoming plugged. Therefore, in some embodiments, the diameters of the probes (e.g., the diameters of the third and second fluid probes 108 and 106) of the triple bubbler system 100 may define a ratio of 5:1. For example, the larger of the second and third fluid probes 106 and 108 may have a diameter of 5.0 mm, and the smaller of the second and third fluid probes 106 and 108 may have a diameter of 1.0 mm. The foregoing ratio may also provide an adequate signal to noise ratio and may decrease error.

Moreover, contrary to the flowrates described in ASTM D 3825-90, the triple bubbler system 100 may utilize fast-bubbling techniques. For example, as described herein, in some embodiments, the triple bubbler system 100 of the present disclosure may utilize a flowrate of at least 30 cc/min.

Additionally, instead of directly using the formula suggested in ASTM D 3825-90, as is described in greater detail below, the methods/techniques described herein utilize a formula that accounts for differences in depth between the first and second fluid probes 104, 106.

In some embodiments, the fast-bubble technique may include metering gas through both of the first fluid probe 104 and the second fluid probe 106. The gas may be metered through each of the first fluid probe 104 and the second fluid probe 106 at a rate between 25 cc/min and 50 cc/min. For example, in some embodiments, gas may be metered through each of the first fluid probe 104 and the second fluid probe 106 at a rate of about 30 cc/min. Additionally, the pressures experienced by each of the first fluid probe 104 and the second fluid probe 106 may be recorded in the manners described in ASTM D 3825-90.

In some embodiments, the triple bubbler system 100 may also and/or simultaneously utilize a fast-bubble technique similar to the fast-bubble technique described in ISO 18213 Parts 1-6, "Nuclear fuel technology-Tank calibration and volume determination for nuclear materials accountancy," First edition, 2008 Mar. 15 for determining fluid depth and fluid density. ISO 18213 Parts 1-6 is incorporated in its entirety by reference here. In some embodiments, the triple bubbler system 100 may utilize the fast-bubble approaches described in ASTM D 3825-90 and ISO 18213 Parts 1-6 in combination to determine a density of the fluid 118, a depth of the fluid 118, and a surface tension of the fluid 118 at least substantially simultaneously. The methods for determining the density, depth, and surface tension of the fluid 118 via the triple bubbler system 100 are described in greater detail below.

In some embodiments, based on the measurements obtained through the above-described fast bubble techniques, the density, depth, and surface tension of the fluid 118 can be determined from the following system of equations (i.e., Equations 1 through 3) describing the total bubble pressure.

$$P_1 = \rho g d_1 + c_1 \rho g r_1 + \left(\frac{c_2 \gamma}{r_1}\right) \quad \text{Equation (1)}$$

$$P_2 = \rho g (d_1 + dX_{12}) + \frac{c_2 \gamma}{r_2} \quad \text{Equation (2)}$$

$$P_3 = \rho g (d_1 - dX_{13}) + c_1 \rho g r_3 + \frac{c_2 \gamma}{r_3} \quad \text{Equation (3)}$$

where $P_1$, $P_2$, and $P_3$ are determined bubbler pressures of the first fluid probe 104, the second fluid probe 106, and the third fluid probe 108, respectively, $d_1$ is the depth of the first fluid probe 104, $dX_{12}$ is the differential distance between the tips of the first fluid probe 104 and the second fluid probe 106, $dX_{13}$ is the differential distance between the tips of the first fluid probe 108 and the third fluid probe 108, $c_1$ and $c_2$ are calibration constants (replacing ⅔ and 2 constants of Parmelee and Young Laplace expressions), $r_1$ is the internal radius of first fluid probe 104, $r_2$ is the internal radius of second fluid probe 106, and $r_3$ is the internal radius of third fluid probe 108, Y represents surface tension, p represents density, and g is the gravitational constant.

The system of equations (i.e., Equations 1 through 3) has five unknowns p, Y, $d_1$, $c_1$, and $c_2$. The foregoing system of equations can be solved algebraically, which results in the following set of equations:

$$\rho = \frac{\lambda(P_1 - P_2) - \beta(P_1 - P_3)}{g(c_1 \psi - \Omega)} \quad \text{Equation (4)}$$

where:

$$\lambda = \frac{r_1 r_2}{r_2 - r_1}, \beta = \frac{r_1 r_3}{r_3 - r_1}, \psi = r_1(\lambda - \beta) + \beta r_3, \text{ and } \Omega = \beta dX_{13} - \lambda dX_{12}$$

$$d_1 = \frac{c_1(r_1^2(\varphi_2 - \varphi_3) - \varphi_2 r_3^2) + \varphi_3 dX_{12} r_2 + \varphi_2 dX_{13} r_3}{\varphi_2(r_3 - r_1) - \varphi_3(r_2 - r_1)} \quad \text{Equation (5)}$$

$$\gamma = \left(\frac{r_1 r_2}{c_2}\right)\left[\frac{P_1(d_1 - dX_{12}) - P_2(d_1 + c_1 r_1)}{r_2(d_1 - dX_{12}) - r_1(d_1 + c_1 r_1)}\right] \quad \text{Equation (6)}$$

As evidenced in Equations. (4) through (6), the constant $c_2$ only appears in the surface tension formula, and the density and depth solutions are independent of the surface tension solution. As a result, an assumption that $c_2$ is equal to 2.0 does not influence a calculation for density or depth. This assumption does, however, influence the accuracy of the surface tension measurement. For nuclear material accountancy purposes, typically only the depth and density are needed, so this calculation approach with an assumed $c_2$ correction is sufficient. Furthermore, if a surface tension of the fluid 118 is available or can be measured independently, an ideal value of $c_2$ can be determined for the above system of equations.

Referring again to ASTM D 3825-90, the formula for determining surface tension provided in in the standard specifies that the probes are submerged at the same depth, and the inner radii are within 5% of 2.0 mm and 0.11 mm. However, in some instances, the dimensions of the triple bubbler system 100 of the present disclosure fall outside of the foregoing dimensions. For example, in some embodiments, the first and second fluid probes 104, 106 may be offset in depth by some distance due to manufacturing limitations, especially in applications utilizing relatively long tubes. Additionally, in some applications the radii of the probes may not fall within the above-mentioned range. Rather, in some embodiments, the probes of the first, second, and third fluid probes 104, 106, 108 having a larger radius may have a radius within a range of about 2.0 mm and about 6.0 mm. Additionally, the probe of the first, second, and third fluid probes 104, 106, 108 having a smaller radius may have a radius within a range of about 0.1 mm and about 3.0 mm. As a non-limiting example, the first and third fluid probes 104, 108 may each have an inner radius of about 5.0 mm, and the second fluid probe 106 may have an inner radius of about 1.0 mm. Accordingly, another formula for determining surface tension with offset probes that may be more appropriate for real world applications may include the following:

$$\gamma = \quad \text{Equation (7)}$$

$$\frac{P_2 - P_1}{2\left(\frac{1}{r_2} - \frac{1}{r_1}\right)} - \frac{\rho g(d_2 - d_1)}{2\left(\frac{1}{r_2} - \frac{1}{r_1}\right)} + \frac{\rho g(r_1 - r_2)}{3\left(\frac{1}{r_2} - \frac{1}{r_1}\right)} + \frac{\rho^2 g^2(r_1^3 - r_2^3)}{24\gamma\left(\frac{1}{r_2} - \frac{1}{r_1}\right)}$$

Furthermore, due to the complexity for solving of y in Equation (7), a lower order of the Taylor series is solved as the following:

$$\gamma = \frac{(P_2 - P_1) - \rho g\left[(d_2 - d_1) + \frac{2}{3}(r_2 - r_1)\right]}{2\left(\frac{1}{r_2} - \frac{1}{r_1}\right)} \quad \text{Equation (8)}$$

In view of the foregoing, the density, surface tension, and depth of the fluid 118 may be determined simultaneously.

Figure 6:
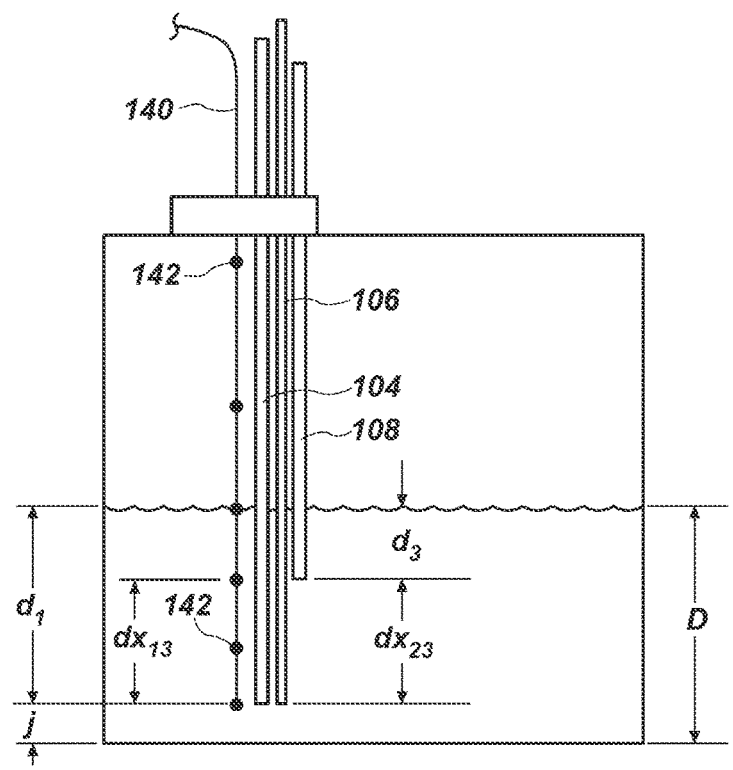
FIG. 6 shows a schematic representation of a triple bubbler system according to one or more embodiments of the present disclosure.
Figure 7:
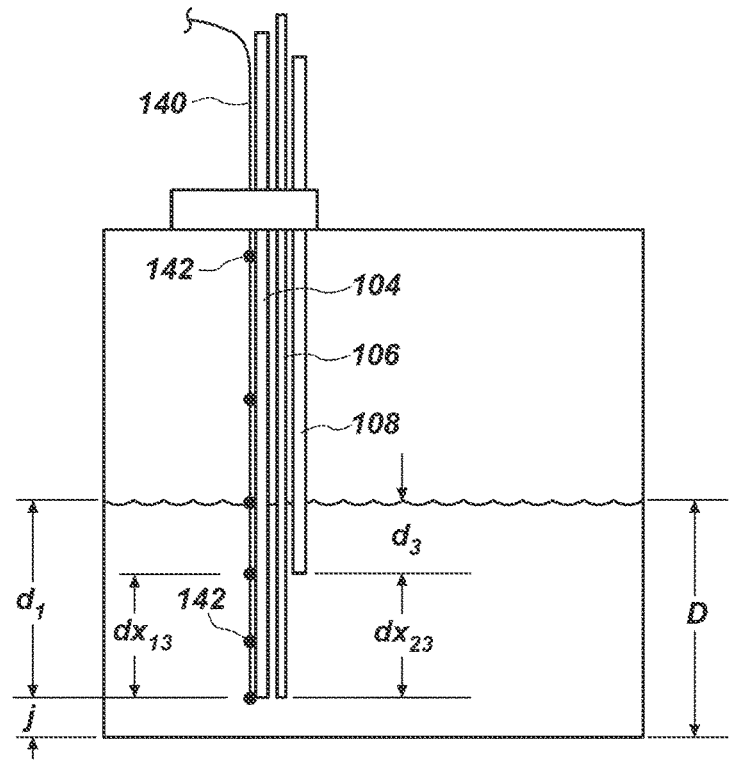
FIG. 7 shows a schematic representation of a triple bubbler system of according to one or more embodiments of the present disclosure.

FIG. 6 is a schematic representation of a triple bubbler system 100 according to one or more embodiments of the present disclosure. FIG. 7 is a schematic representation of the triple bubbler system 100 of according to one or more embodiments of the present disclosure. In some embodiments, beyond the elements described above in regard to FIGS. 1-5, the triple bubbler system 100 may include a multi-lead thermocouple 140. For instance, the multi-lead thermocouple 140 may include a ganged thermocouple (e.g., a multi-junction thermocouple). In particular, the multi-lead thermocouple 140 may include multiple junctions 142 (e.g., welds) along a length of the multi-lead thermocouple 140. For instance, the multi-lead thermocouple 140 may include two dissimilar thermo-element materials having a plurality of points where the two dissimilar thermo-element materials intersect. Each of the plurality of points (i.e., junctions 142) may include an independent sensing point. In some embodiments, each of the plurality of points (i.e., junctions 142) may include a spot-weld junction.

Additionally, in some embodiments, the multi-lead thermocouple 140 may span a depth of the fluid 118 or at least a depth to which a deepest probe of the triple bubbler system 100 reaches (e.g., the second probe 106 or the third probe 108). As result, the multi-lead thermocouple 140 may enable measuring multiple temperatures along a length of the triple bubbler system 100. In some embodiments, the multi-lead thermocouple 140 may be separate, distinct, and independent from the triple bubbler system 100, as depicted in FIG. 6. In other embodiments, the multi-lead thermocouple 140 may be attached to a portion of the triple bubbler system 100. For example, the multi-lead thermocouple 140 may be attached to one or more of the shroud 128, the first fluid probe 104, the second fluid probe 106, and/or the third fluid probe 108, as depicted in FIG. 7. The multi-lead thermocouple 140 may be operably coupled to the controller 120 and may provide temperature data to the controller 120.

Obtaining temperature data at multiple locations along a length and depth of the triple bubbler system 100 enables the controller 120 to determine a temperature profile of the environment to which the triple bubbler system 100 is be subjected and/or a temperature profile of the triple bubbler system 100 itself along a longitudinal length of the triple bubbler system 100. Furthermore, based on the determined temperature profile of the triple bubbler system 100, thermal expansion of the triple bubbler system 100 can be determined along the longitudinal length of the triple bubbler system 100. In other words, a thermal expansion profile of the triple bubbler system 100 can be determined. Furthermore, based on the determined temperature profile of the triple bubbler system 100 and/or the determined thermal expansion profile of the triple bubbler system 100, accurate corrections, due to thermal expansion of the triple bubbler system 100, can be applied to any of the calculations described herein, thereby improving the accuracy of the calculations. The foregoing provides advantages over conventional bubbler systems where such corrections and accuracy are not feasible.

Figure 8:
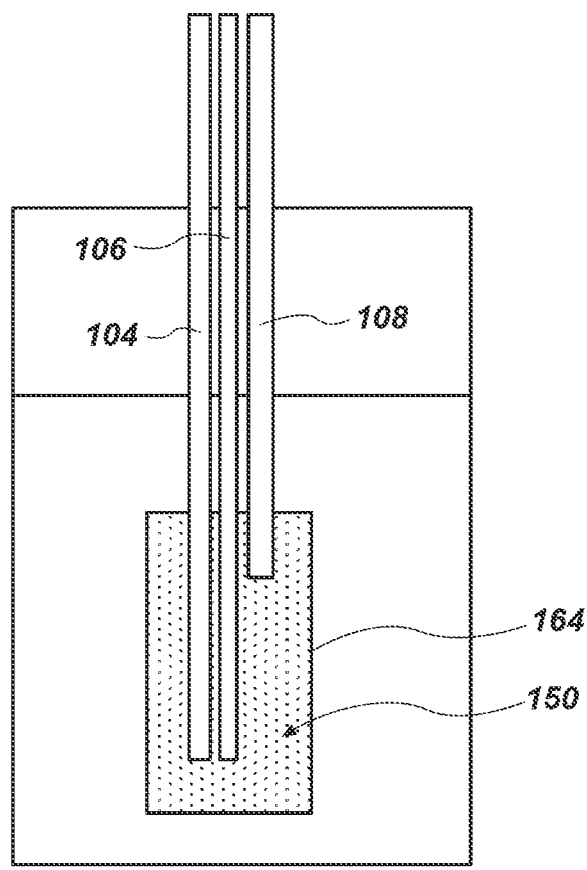
FIG. 8 shows a schematic view of a triple bubbler system according to one or more embodiments of the present disclosure.
Figure 9:
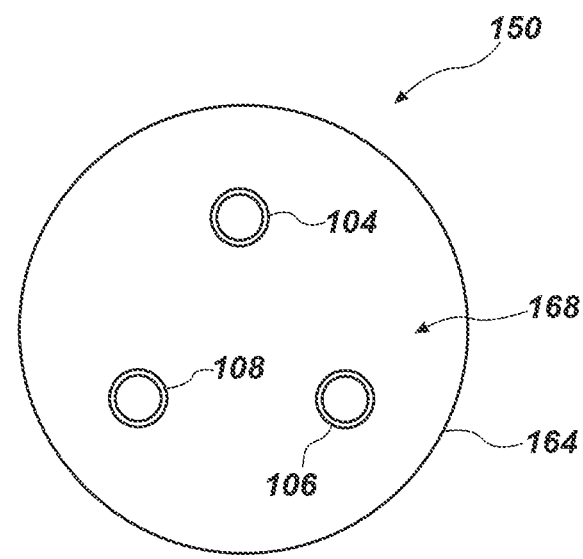
FIG. 9 shows a schematic top view of a cover member according to one or more embodiments of the present disclosure.
Figure 10:
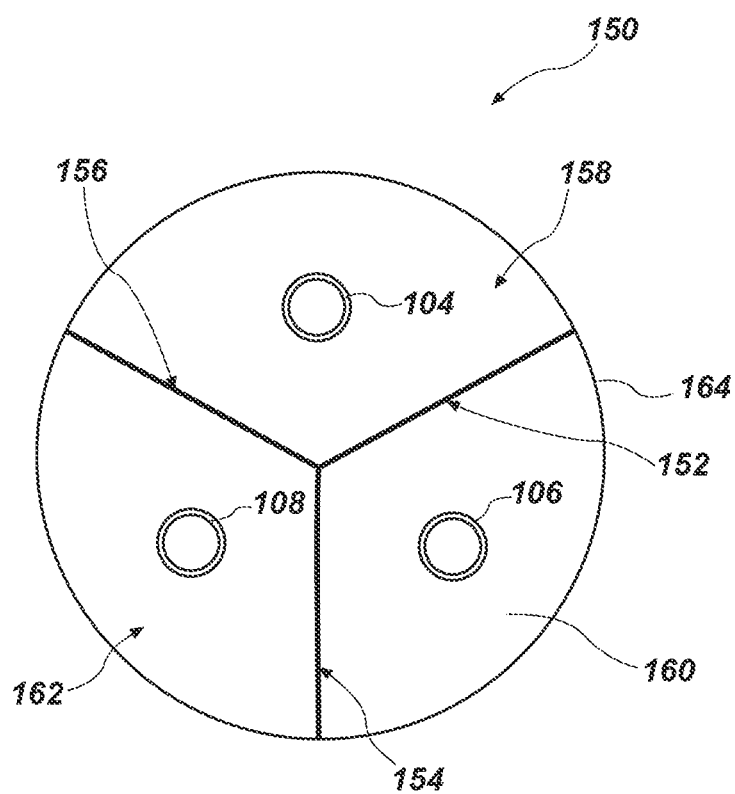
FIG. 10 shows a schematic top view of a cover member according to one or more additional embodiments of the present disclosure.
Figure 11A:
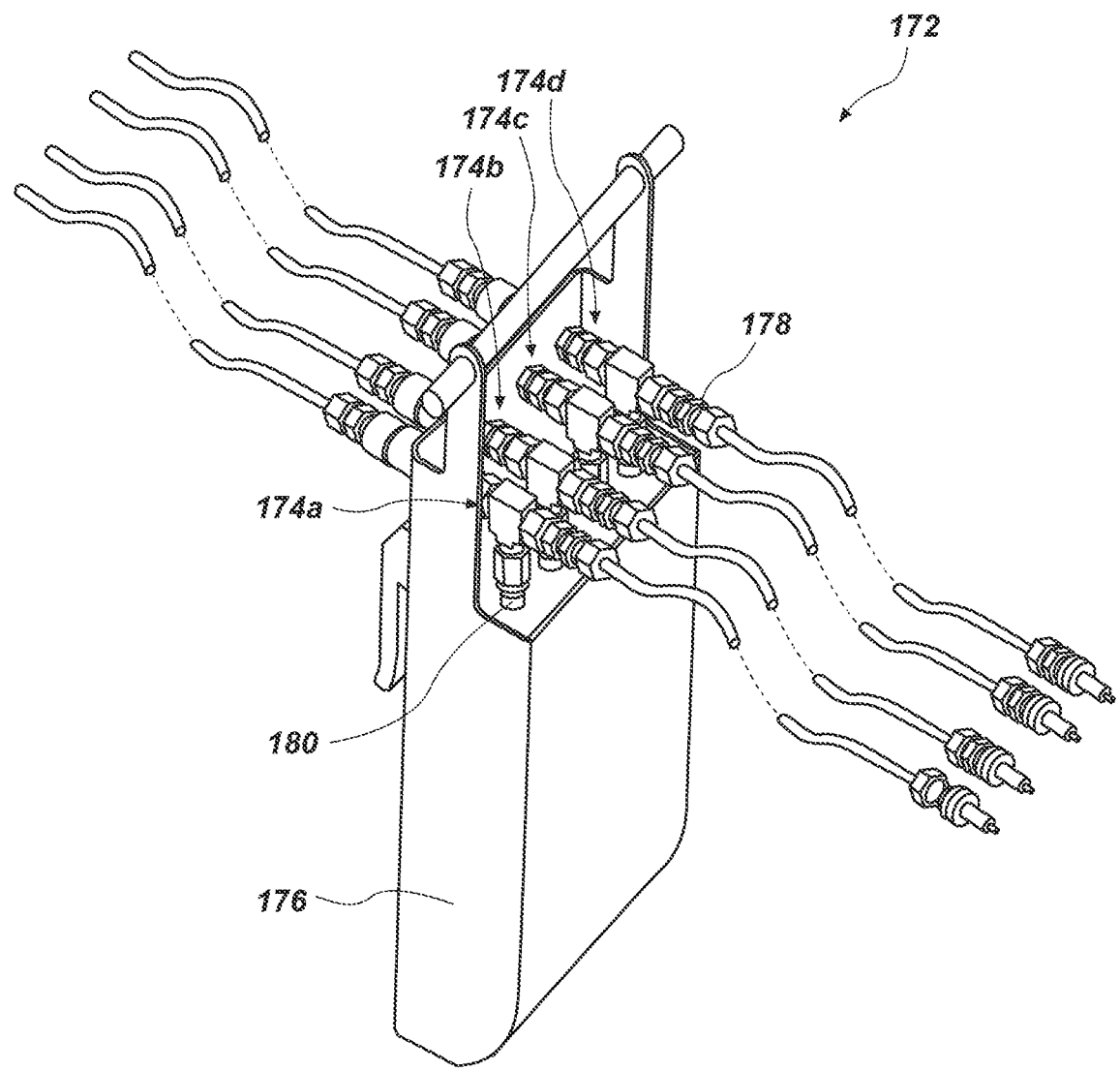
Figure 11C:
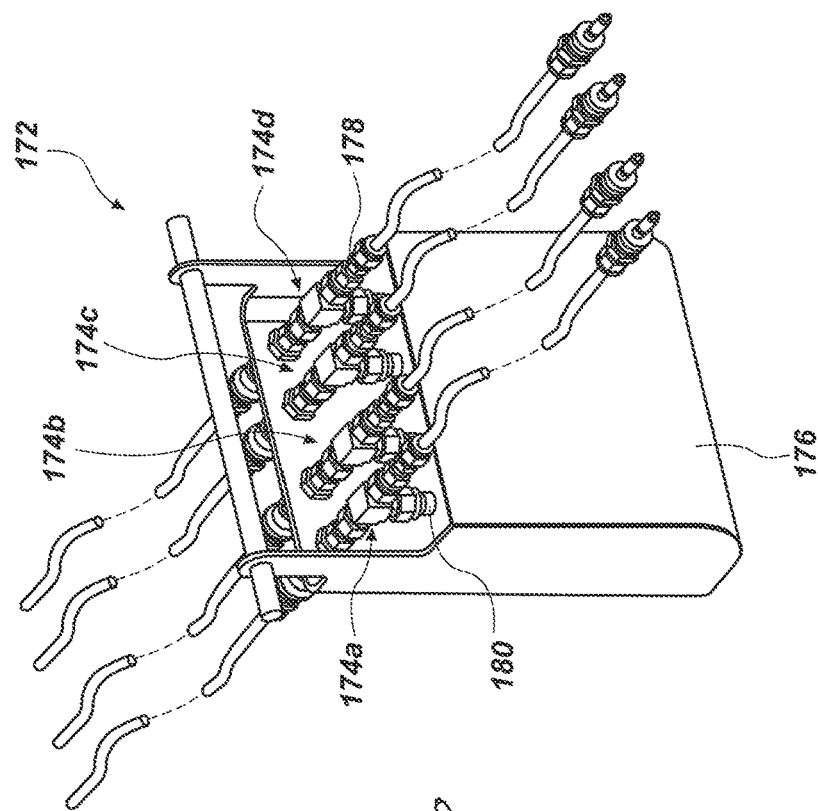
Figure 11B:
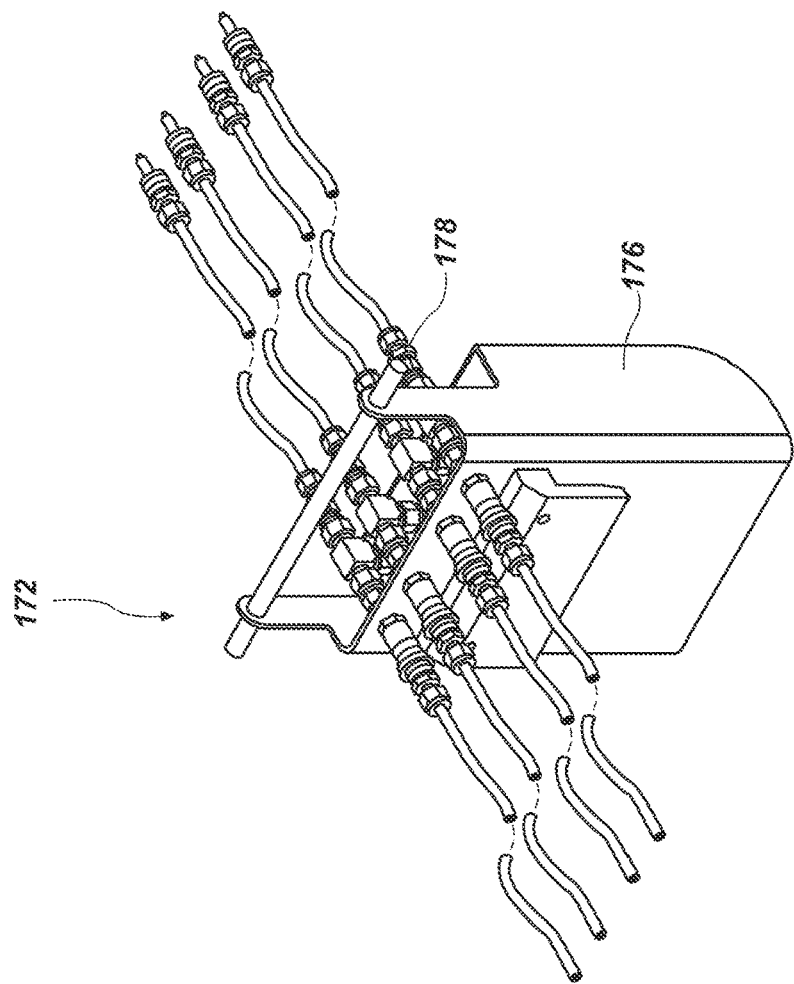
Figure 11D:
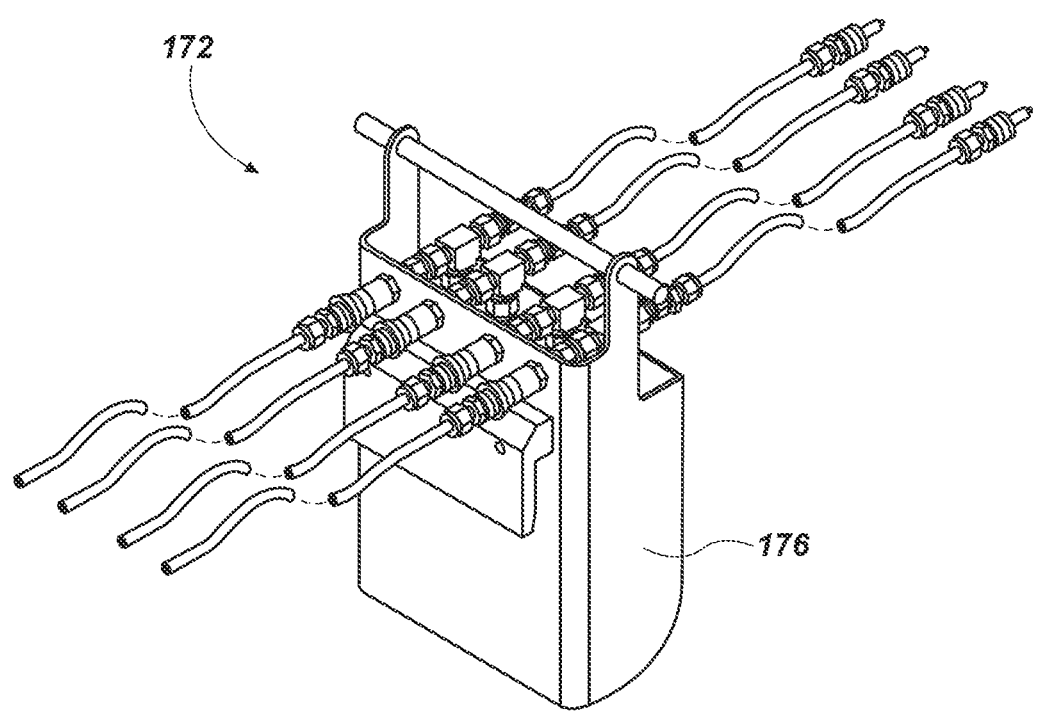

FIG. 8 is a schematic view of a triple bubbler system 100 according to one or more embodiments of the present disclosure. In some embodiments, the triple bubbler system 100 may further include a cover member 150 oriented over the tips of the first fluid probe 104, the second fluid probe 106, and the third fluid probe 108. FIG. 9 is a schematic top view of the cover member 150 according to one or more embodiments of the present disclosure. FIG. 10 is a schematic top view of the cover member 150 according to one or more additional embodiments of the present disclosure. The cover member 150 may assist in preventing bubbles formed by a given probe (e.g., the third fluid probe 108) from interfering with bubble formation or pressure measurements of the other probes. Additionally, the cover member 150 may reduce the effect of turbulent flow within the fluid 118 on bubble formation and pressure measurements of the first fluid probe 104, the second fluid probe 106, and the third fluid probe 108.

Referring to FIGS. 8-10 together, in come embodiments, the cover member 150 may include one or more divider members 152, 154, 156 defining individual chambers 158, 160, 162 (e.g., compartments) for the first fluid probe 104, the second fluid probe 106, and the third fluid probe 108 (as shown in FIG. 10). As shown in FIG. 10, in some embodiments, the cover member 150 may include an outer tubular wall 164 defining an inner chamber 168 and three divider members 152, 154, 156 disposed within the inner chamber 168 and defining three circular-sector-shaped chambers 158, 160, 162. Each chamber 158, 160, 162 may house a respective probe of the first fluid probe 104, the second fluid probe 106, and the third fluid probe 108.

In additional embodiments, the cover member 150 may be open and may not include any divider member between the first fluid probe 104, the second fluid probe 106, and the third fluid probe 108 (as shown in FIG. 9). As shown in FIG. 9, in some embodiments, the cover member 150 may include an outer tubular wall 164 defining a single inner chamber 168, and all three of the first fluid probe 104, the second fluid probe 106, and the third fluid probe 108 may be disposed within the single inner chamber 168.

Referring to FIGS. 8-10 together, in some embodiments, the outer tubular wall 164 may be solid (e.g., continuous), perforated, mesh, or any combination thereof. Likewise, the divider members 152, 154, 156 may be solid (e.g., continuous), perforated, mesh, or any combination thereof. Additionally, in some embodiments, a bottom of the cover member 150 may be open, perforated, mesh, or any combination thereof.

Additionally, in some embodiments, the cover member 150 may be directly attached to one or more of the first fluid probe 104, the second fluid probe 106, and/or the third fluid probe 108. In one or more embodiments, the cover member 150 may be attached to the shroud 128. Furthermore, any attachment between the shroud 128 and/or the fluid probes 104, 106, 108 and the cover member 150 may have a minimal amount of surface area at the atmosphere-fluid interface. Minimizing the surface area of the attachment between the shroud 128 and/or the fluid probes 104, 106, 108 and the cover member 150 may reduce the Marangoni effect (e.g., a gradient of temperature above the fluid 118 level creating a gradient of increasing surface tension), which causes the fluid 118 to climb the surface of the attachment, shroud 128, and/or cover member 150. In other embodiments, the cover member 150 may be attached to the vessel 116. In other embodiments, the cover member 150 may be free standing and may be strategically placed within the vessel 116 to accommodate the first fluid probe 104, the second fluid probe 106, and/or the third fluid probe 108.

Furthermore, although the cover member 150 is depicted as having a general cylindrical tube shape, the disclosure is not so limited. Rather, the cover member 150 may have a rectangular prism shape, an elliptic cylinder shape, an elongated elliptic cylinder shape, a triangular prism shape, or any other shape. Moreover, the first fluid probe 104, the second fluid probe 106, and/or the third fluid probe 108 need not be oriented relative to each other in a triangle formation. Rather, the first fluid probe 104, the second fluid probe 106, and/or the third fluid probe 108 may be oriented relative to one another in any formation, including, but not limited to, a linear formation.

As noted above, the cover member 150 may assist in preventing bubbles formed by a given probe (e.g., the third fluid probe 108) during operation from interfering with bubble formation and/or pressure measurements of the other probes. Additionally, the cover member 150 may reduce the effect of turbulent flow within the fluid 118 on bubble formation and pressure measurements of the first fluid probe 104, the second fluid probe 106, and the third fluid probe 108. The foregoing may provide advantages over conventional bubbler systems. For example, the triple bubbler system 100 of the present disclosure may provide more accurate measurements in turbulent fluids.

In one or more embodiments, the triple bubbler system 100 may further include a breakout box 172 as depicted in FIGS. 11A-11I. FIG. 11A through 11I depict various views of a breakout box 172 according to one or more embodiments of the present disclosure. The breakout box 172 may be disposed between the mass flow controllers 112a, 112b, 112c of each individual line and a tip of a respective fluid probe 104, 106, 108. In some embodiments, the breakout box 172 may be coupled to each of the fluid probes 104, 106, 108. Furthermore, the breakout box 172 may include a plurality of breakout assemblies 174a, 174b, 174c, 174d and a fluid catch 176. Each of the breakout assemblies 174a, 174b, 174c, 174d may be coupled to a respective probe of the fluid probes 104, 106, 108 and the atmosphere probe 102. Additionally, each breakout assembly may include the fluid catch 176, a secondary orifice 178, and a fusible plug 180. The fusible plug 180 of each breakout assembly may be disposed above the fluid catch 176. Furthermore, fusible plug 180 of each breakout assembly may have a relatively low melting temperature.

In operation, if the fluid 118 were to move up the probes and leave containment, the secondary orifice 178 may slow a flowrate of the fluid 118, and upon reaching the fusible plug 180, the fusible plug 180 melts and releases the fluid 118 into the fluid catch 174 (i.e., opens a secondary fluid path for the fluid 118). Accordingly, the breakout box 172 may assist in preventing materials (e.g., radioactive materials) from leaving containment and may increase the safety of the triple bubbler system 100 and applicability of the triple bubbler system 100.

Referring still to FIGS. 11A-11I, in some embodiments, the triple bubbler system 100 may include one or more sensors and control valves (e.g., backflow valves). The sensor may be configured to detect fluid 118 travelling upward through the probes 104, 106, 108, and in response to detecting fluid travelling upward through the probes 104, 106, 108, the controller 120 may cause the control valves to open or close to prevent fluid from escaping containment. The one or more sensors and control valve may be included instead of or in addition to the breakout box 172.

Figure 12:
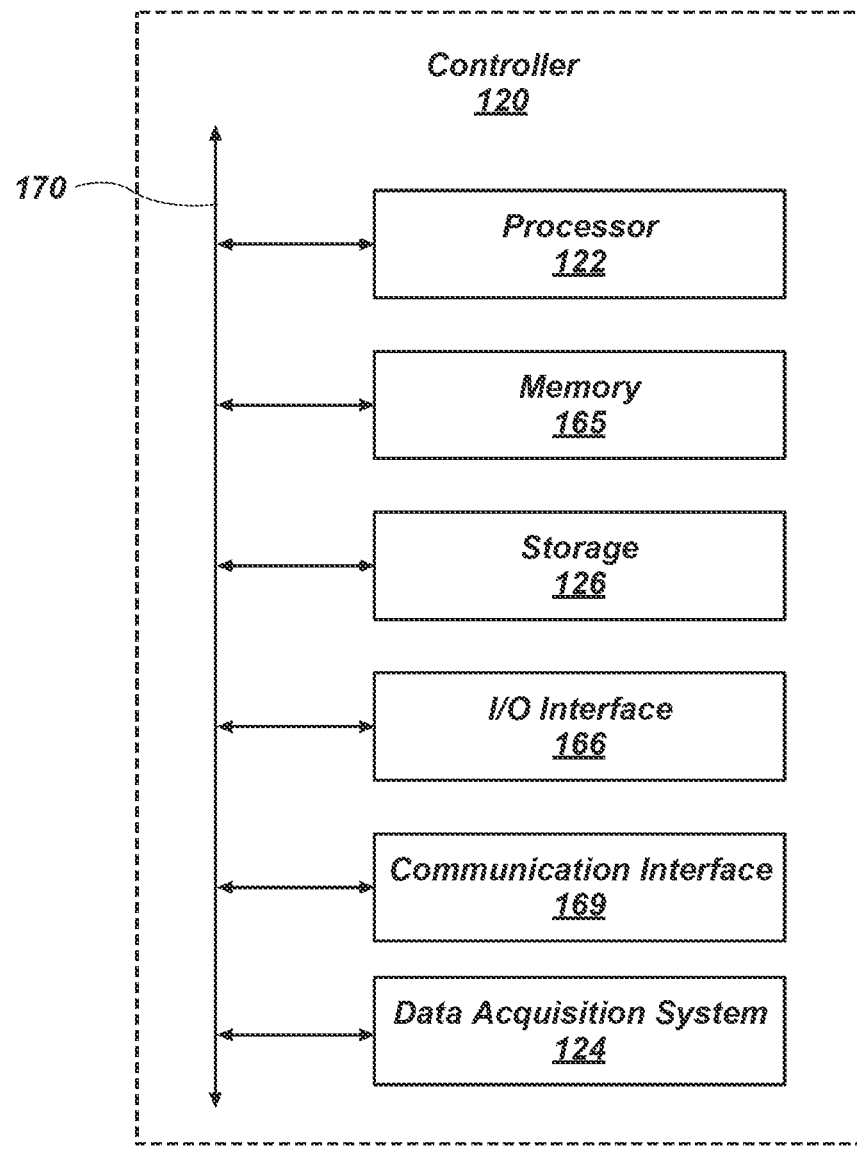
FIG. 12 shows a block diagram of a controller according to one or more embodiments of the present disclosure.

FIG. 12 illustrates a block diagram of an example controller 120 that may be configured to cause any one or more of the processes of the triple bubbler system 100 described above. One will appreciate that one or more computing devices may form the controller 120 of the triple bubbler system 100. As shown by FIG. 12, the controller 120 can comprise a processor 122, a memory 165, a storage device 126, an I/O interface 166, a data acquisition system 124, and a communication interface 169, which may be communicatively coupled by way of a communication infrastructure. While an example controller 120 is shown in FIG. 12, the components illustrated in FIG. 12 are not intended to be limiting. Additional or alternative components may be used in other embodiments. Furthermore, in certain embodiments, the controller 120 can include fewer components than those shown in FIG. 12. Components of the controller 120 shown in FIG. 12 will now be described in additional detail.

In one or more embodiments, the processor 122 includes hardware for executing instructions, such as those making up a computer program. As an example, and not by way of limitation, to execute instructions, the processor 122 may retrieve (or fetch) the instructions from an internal register, an internal cache, the memory 165, or the storage device 126 and decode and execute them. In one or more embodiments, the processor 122 may include one or more internal caches for data, instructions, or addresses. As an example, and not by way of limitation, the processor 122 may include one or more instruction caches, one or more data caches, and one or more translation look aside buffers (TLBs). Instructions in the instruction caches may be copies of instructions in the memory 165 or the storage 606.

The controller 120 includes memory 165, which is coupled to the processor(s) 602. The memory 165 may be used for storing data, metadata, and programs for execution by the processor(s). The memory 165 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 165 may be internal or distributed memory.

The controller 120 includes a storage device 126 that includes storage for storing data or instructions. As an example, and not by way of limitation, storage device 126 can comprise a non-transitory storage medium described above. The storage device 126 may include a hard disk drive (HDD), a floppy disk drive, Flash memory, an optical disc, a magneto-optical disc, magnetic tape, or a Universal Serial Bus (USB) drive or a combination of two or more of these. The storage device 126 may include removable or non-removable (or fixed) media, where appropriate. The storage device 126 may be internal or external to the controller 120. In one or more embodiments, the storage device 126 is non-volatile, solid-state memory. In other embodiments, the storage device 126 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The controller 120 also includes one or more input or output ("I/O") devices/interfaces 166 (e.g., a touch display), which are provided to allow a user to provide input to, receive output from, and otherwise transfer data to and receive data from controller 120. The I/O devices/interfaces 166 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 166 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 166 is configured to provide graphical data to a display for presentation to a user. The graphical data may be representative of one or more graphical user interfaces and/or any other graphical content as may serve a particular implementation.

The data acquisition system 124 may receive signals from one or more of the first fluid probe 104, the second fluid probe 106, the third fluid probe 108, the plurality of differential pressure transducers 110a, 110b, 110c, the plurality of mass flow controllers 112a, 112b, 112c, the multi-lead thermocouple 140, and/or the gas supply 114 and may include, or have associated therewith, analog to digital conversion circuitry to convert the analog signals from the above-mentioned elements and any other the various sensors into digital numeric values that can be manipulated and/or analyzed by the controller 120 (e.g., the processor 122 and/or the data acquisition system 124 of the controller 120). The data acquisition system 124 may further include one or more software programs developed using various general purpose programming languages such as Assembly, BASIC, C, C++, C#, Fortran, Java, LabVIEW, Lisp, Pascal, Ladder Logic, etc. As a non-limiting example, the controller 120 may include any data acquisition system known in the art.

The controller 120 can further include a communication interface 169. The communication interface 169 can include hardware, software, or both. The communication interface 169 can provide one or more interfaces for communication (such as, for example, packet-based communication) between the controller 120 and one or more other computing devices or networks. As an example, and not by way of limitation, the communication interface 169 may include a network interface controller (NIC) or network adapter for communicating with an Ethernet or other wire-based network or a wireless NIC (WNIC) or wireless adapter for communicating with a wireless network, such as a WI-FI and/or Bluetooth. The controller 120 can further include a bus 170. The bus 170 can comprise hardware, software, or both that couples components of controller 120 to each other.

The present disclosure further includes the following embodiments:

Embodiment 1. A triple bubbler system, comprising: a first fluid probe configured to be at least partially submerged within a fluid; a second fluid probe configured to be at least partially submerged within the fluid; a third fluid probe configured to be at least partially submerged within the fluid; an gas source operably coupled to the first fluid probe, the second fluid probe, and the third fluid probe and configured to meter gas through the first fluid probe, the second fluid probe, and the third fluid probe to form bubbles at tips of each of the first fluid probe, the second fluid probe, and the third fluid probe; and a cover member disposed at least partially over the tips of the first, second, and third fluid probes, the cover member configured to at least partially prevent bubbles formed and escaping the tips of the first, second, and third fluid probes from interfering with other bubbles formed at each other tips.

Embodiment 2. The triple bubbler system of embodiment 1, wherein the first fluid probe and the third fluid probe have at least substantially the same inner radii.

Embodiment 3. The triple bubbler system of embodiments 1 or 2, wherein the second fluid probe and the third fluid probe have differing inner radii.

Embodiments 4. The triple bubbler system of embodiments 1 through 3, wherein the first fluid probe and the second fluid probe have at least substantially a same length.

Embodiment 5. The triple bubbler system of embodiments 1 through 4, further comprising an atmospheric probe configured to measure atmosphere conditions above the fluid.

Embodiment 6. The triple bubbler system of embodiments 1 through 5, wherein the cover member defines respective chambers for each of the first fluid probe, the second fluid probe, and the third fluid probe.

Embodiment 7. The triple bubbler system of embodiment 6, wherein each chamber defined by the cover member comprises a circular-sector shape.

Embodiment 8. The triple bubbler system of embodiments 1 through 5, wherein the cover member comprises divider members between each of the first fluid probe, the second fluid probe, and the third fluid probe.

Embodiment 9. The triple bubbler system of embodiments 1 through 5, wherein the cover member extends beyond the tips of the first fluid probe, the second fluid probe, and the third fluid probe in an axial direction of the first fluid probe, the second fluid probe, and the third fluid probe.

Embodiment 10. The triple bubbler system of embodiments 1 through 5, wherein the cover member is attached to at least one of the first fluid probe, the second fluid probe, or the third fluid probe.

Embodiment 11. The triple bubbler system of embodiments 1 through 5, wherein the cover member comprises: an outer wall defining an inner chamber; and a plurality of divider members disposed within the inner chamber of the outer wall and defining a plurality of chambers.

Embodiment 12. The triple bubbler system of embodiment 11, wherein the outer wall comprises at least one of a solid wall, a perforated wall, a mesh wall, or a combination thereof.

Embodiment 13. A triple bubbler system, comprising: a first fluid probe configured to be at least partially submerged within a fluid; a second fluid probe configured to be at least partially submerged within the fluid; a third fluid probe configured to be at least partially submerged within the fluid; an gas source operably coupled to the first fluid probe, the second fluid probe, and the third fluid probe and configured to meter gas through the first fluid probe, the second fluid probe, and the third fluid probe to form bubbles at tips of each of the first fluid probe, the second fluid probe, and the third fluid probe; a thermocouple comprising a plurality of junctions disposed along an axis at least substantially parallel to longitudinal axes of the first fluid probe, the second fluid probe, and the third fluid probe, wherein at least one of the junctions is configured to be submerged in the fluid, and wherein at least one of the junctions is configured to be disposed above the fluid; and a controller operably coupled to the gas source and the thermocouple and comprising: at least one processor; and at least one non-transitory computer-readable storage medium storing instructions thereon that, when executed by the at least one processor, cause the controller to: receive temperature data from the plurality of junctions of the thermocouple; and based on the received temperature data, determine a temperature profile along the axis along which the plurality of junctions are disposed.

Embodiment 14. The triple bubbler system of embodiment 13, further comprising instruction that, when executed by the at least one processor, cause the controller to determine, based at least partially on the determined temperature profile, a thermal expansion profile of the at least one of the first, second, or third fluid probes.

Embodiment 15. The triple bubbler system of embodiment 14, further comprising instruction that, when executed by the at least one processor, cause the controller to: receive pressure data related to the first fluid probe, the second fluid probe, and the third fluid probe; determine, based at least partially on the received pressure data, a density, a depth, and a surface tension of the fluid.

Embodiment 16. The triple bubbler system of embodiment 14, further comprising instruction that, when executed by the at least one processor, cause the controller to correct the determined density of the fluid, the determine depth of the fluid, and the determined surface tension of the fluid based at least partially on the determined thermal expansion profile.

Embodiment 17. A method of measuring fluid characteristics within a turbulent fluid, the method comprising: metering a gas through each of a first fluid probe, a second fluid probe, and a third fluid probe at a rate of at least 30 cc/min and into a fluid; measuring bubble pressures of each of the first fluid probe, the second fluid probe, and the third fluid probe caused by the metered gas and via differential pressure transducers; and based at least partially on the measured bubble pressures of each of the first fluid probe, the second fluid probe, and the third fluid, determining a density, a surface tension, and a depth of the fluid.

Embodiment 18. The method of embodiment 17, further comprising: determining a temperature profile of the fluid along an axis at least substantially parallel to longitudinal axes of the first fluid probe, the second fluid probe, and the third fluid probe; and based on the determined temperature profile of the fluid, determining a thermal expansion profile of each of the first fluid probe, the second fluid probe, and the third fluid probe.

Embodiment 19. The method of embodiment 18, further comprising, based at least partially on the determined thermal expansion profiles of the first fluid probe, the second fluid probe, and the third fluid probe, correcting determined values of the density, the surface tension, and the depth of the fluid.

Embodiment 20. The method of embodiment 18, wherein the first fluid probe and the third fluid probe have at least substantially the same inner radii, the second fluid probe and the third fluid probe have differing inner radii, and the second fluid probe and the third fluid probe have at least substantially a same length.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A triple bubbler system, comprising:
a first fluid probe configured to be at least partially submerged within a fluid;
a second fluid probe configured to be at least partially submerged within the fluid;
a third fluid probe configured to be at least partially submerged within the fluid;
a gas source operably coupled to the first fluid probe, the second fluid probe, and the third fluid probe and configured to meter gas through the first fluid probe, the second fluid probe, and the third fluid probe to form bubbles at tips of each of the first fluid probe, the second fluid probe, and the third fluid probe; and
a cover member disposed at least partially over the tips of the first, second, and third fluid probes, the cover member configured to at least partially prevent bubbles formed and escaping the tips of the first, second, and third fluid probes from interfering with other bubbles formed at each other tips, the cover member defining an inner cavity with at least the tips of the first, second, and third fluid probes disposed therein and including one or more opening formed in at least one position selected from an outer wall and a bottom of the cover member, the one or more openings configured for fluid flow into and out of the inner cavity.

2. The triple bubbler system of claim 1, wherein the first fluid probe and the third fluid probe have at least substantially the same inner radii.

3. The triple bubbler system of claim 1, wherein the second fluid probe and the third fluid probe have differing inner radii.

4. The triple bubbler system of claim 1, wherein the first fluid probe and the second fluid probe have at least substantially a same length.

5. The triple bubbler system of claim 1, further comprising an atmospheric probe configured to measure atmosphere conditions above the fluid.

6. The triple bubbler system of claim 1, wherein the cover member defines respective chambers for each of the first fluid probe, the second fluid probe, and the third fluid probe.

7. The triple bubbler system of claim 6, wherein each chamber defined by the cover member comprises a circular-sector shape.

8. The triple bubbler system of claim 1, wherein the cover member comprises divider members between each of the first fluid probe, the second fluid probe, and the third fluid probe.

9. The triple bubbler system of claim 1, wherein the cover member extends beyond the tips of the first fluid probe, the second fluid probe, and the third fluid probe in an axial direction of the first fluid probe, the second fluid probe, and the third fluid probe.

10. The triple bubbler system of claim 1, wherein the cover member is attached to at least one of the first fluid probe, the second fluid probe, or the third fluid probe.

11. The triple bubbler system of claim 1, wherein the cover member comprises:
a plurality of divider members disposed within the inner cavity of the outer wall and defining a plurality of chambers.

12. The triple bubbler system of claim 11, wherein the one or more openings include at least one structure selected from perforations in the outer wall, mesh in the outer wall, an open bottom, perforations in the bottom, mesh in the bottom, and any combination thereof.

13. A triple bubbler system, comprising:
a first fluid probe configured to be at least partially submerged within a fluid;
a second fluid probe configured to be at least partially submerged within the fluid;
a third fluid probe configured to be at least partially submerged within the fluid;
a gas source operably coupled to the first fluid probe, the second fluid probe, and the third fluid probe and configured to meter gas through the first fluid probe, the second fluid probe, and the third fluid probe to form bubbles at tips of each of the first fluid probe, the second fluid probe, and the third fluid probe;
a thermocouple comprising a plurality of junctions disposed along an axis at least substantially parallel to longitudinal axes of the first fluid probe, the second fluid probe, and the third fluid probe, wherein at least one of the junctions is configured to be submerged in the fluid, and wherein at least one of the junctions is configured to be disposed above the fluid; and
a controller operably coupled to the gas source and the thermocouple and comprising:
at least one processor; and
at least one non-transitory computer-readable storage medium storing instructions thereon that, when executed by the at least one processor, cause the controller to:
receive temperature data from the plurality of junctions of the thermocouple; and
based on the received temperature data, determine a temperature profile along the axis along which the plurality of junctions are disposed.

14. The triple bubbler system of claim 13, further comprising instructions that, when executed by the at least one processor, cause the controller to determine, based at least partially on the determined temperature profile, a thermal expansion profile of the at least one of the first, second, or third fluid probes.

15. The triple bubbler system of claim 14, further comprising instructions that, when executed by the at least one processor, cause the controller to:
receive pressure data related to the first fluid probe, the second fluid probe, and the third fluid probe; and
determine, based at least partially on the received pressure data, a density, a depth, and a surface tension of the fluid.

16. The triple bubbler system of claim 14, further comprising instructions that, when executed by the at least one processor, cause the controller to correct the determined density of the fluid, the determined depth of the fluid, and the determined surface tension of the fluid based at least partially on the determined thermal expansion profile.

17. A method of measuring fluid characteristics within a turbulent fluid, the method comprising:
metering a gas through each of a first fluid probe, a second fluid probe, and a third fluid probe at a rate of at least 30 cc/min and into a fluid;
measuring bubble pressures of each of the first fluid probe, the second fluid probe, and the third fluid probe caused by the metered gas and via differential pressure transducers; and
based at least partially on the measured bubble pressures of each of the first fluid probe, the second fluid probe, and the third fluid, determining a density, a surface tension, and a depth of the fluid.

18. The method of claim 17, further comprising:
- determining a temperature profile of the fluid along an axis at least substantially parallel to longitudinal axes of the first fluid probe, the second fluid probe, and the third fluid probe; and
- based on the determined temperature profile of the fluid, determining a thermal expansion profile of each of the first fluid probe, the second fluid probe, and the third fluid probe.

19. The method of claim 18, further comprising, based at least partially on the determined thermal expansion profiles of the first fluid probe, the second fluid probe, and the third fluid probe, correcting determined values of the density, the surface tension, and the depth of the fluid.

20. The method of claim 18, wherein the first fluid probe and the third fluid probe have at least substantially the same inner radii, the second fluid probe and the third fluid probe have differing inner radii, and the first fluid probe and the second fluid probe have at least substantially a same length.

* * * * *

UNITED STATES PATENT AND TRADEMARK OFFICE
CERTIFICATE OF CORRECTION

| | | |
|---|---|---|
| PATENT NO. | : 11,747,256 B2 | |
| APPLICATION NO. | : 17/249849 | |
| DATED | : September 5, 2023 | |
| INVENTOR(S) | : Gregory G. Galbreth and Ammon N. Williams | |

It is certified that error appears in the above-identified patent and that said Letters Patent is hereby corrected as shown below:

In the Specification

| | | |
|---|---|---|
| Column 8, | Line 55, | change "probe 108, Y represents" to --probe 108, $Y$ represents-- |
| Column 8, | Line 55, | change "tension, p represents" to --tension, $\rho$ represents-- |
| Column 8, | Line 56, | change "and g is the" to --and $g$ is the-- |
| Column 8, | Line 58, | change "unknowns p, Y, $d_1$, $c_1$, and $c_2$." to --unknowns $\rho$, $Y$, $d_1$, $c_1$, and $c_2$.-- |
| Column 9, | Line 65, | change "solving of y in" to --solving of $\gamma$ in-- |

In the Claims

| | | | |
|---|---|---|---|
| Claim 1, | Column 17, | Line 24, | change "more opening formed" to --more openings formed-- |

Signed and Sealed this
Twenty-seventh Day of August, 2024

Katherine Kelly Vidal
*Director of the United States Patent and Trademark Office*